United States Patent [19]

Putter et al.

[11] 3,998,485
[45] Dec. 21, 1976

[54] BUMPER ARRANGEMENT FOR A VEHICLE EQUIPPED WITH LONGITUDINAL MEMBERS

[75] Inventors: Henning Pütter, Wolfsburg, Reinhard Breitinger, Hehlingen, both of Germany

[73] Assignee: Volkswagenwerk Aktiengesellschaft, Wolfsburg, Germany

[22] Filed: May 20, 1975

[21] Appl. No.: 579,048

[30] Foreign Application Priority Data

June 8, 1974 Germany ............................ 2427764

[52] U.S. Cl. ................................................ 293/70
[51] Int. Cl.² ......................................... B60R 19/06
[58] Field of Search ................... 293/60, 70, 85, 98, 293/73, 75

[56] References Cited

UNITED STATES PATENTS

| | | | |
|---|---|---|---|
| 3,508,633 | 4/1970 | Nishimura et al. | 293/70 X |
| 3,511,345 | 5/1970 | Takamatsu et al. | 293/70 X |

Primary Examiner—Allen N. Knowles
Assistant Examiner—Norman L. Stack, Jr.
Attorney, Agent, or Firm—Brumbaugh, Graves, Donohue & Raymond

[57] ABSTRACT

A vehicle bumper arrangement for vehicles with longitudinal structural members has two oppositely directed stepped boxes at the end of each longitudinal member. A bumper bar is attached to the outermost box by a bumper extension piece or tube. The stepped boxes are designed to deform in a predetermined manner during a collision in order to absorb the impact forces.

5 Claims, 1 Drawing Figure

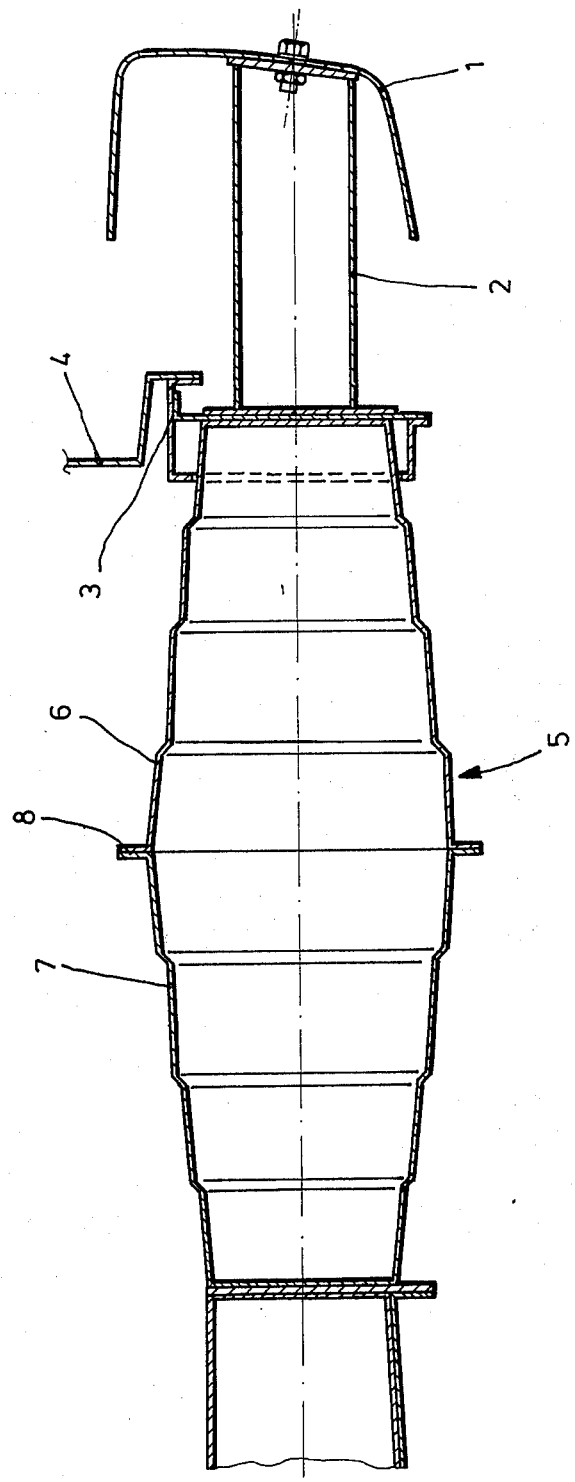

BUMPER ARRANGEMENT FOR A VEHICLE EQUIPPED WITH LONGITUDINAL MEMBERS

BACKGROUND OF THE INVENTION

This invention relates to bumper arrangements for vehicles and, more particularly, to bumper arrangements for automobiles equipped with longitudinal structural members that are zonally deformable.

A bumper arrangement for a vehicle with longitudinal structural members is disclosed in German patent application (Offenlegungsschrift) No. 2,137,515, 63c, 43/25. In that arrangement the front of the longitudinal members are circumferentially corrugated. These corrugations are designed so that they will fold together during an impact that is approximately in the direction of the axis of the corrugations. Thus, the longitudinal members will be zonally deformable in the region of the corrugations. With this type of bumper system, control of the deformation of the corrugations and, hence, the energy dissipation during an impact is difficult becuase the cross-sectional dimensions of the longitudinal member are generally constant in the deformable, as well as the non-deformable, regions.

The series connection of several shock absorbing elements along a section of a longitudinal member is described in Offenlegungsschrift No. 2,227,885, 63c, 70. However, in the bumper system of that German patent application the shock absorbers are piston-cylinder elements. Likewise, Offenlegungsschrift No. 2,216,270, 63c, 70, discloses a vehicle with a plastically deformable zone at the front of its longitudinal member, preceded by a hydraulic shock absorber. This shock absorber carries a bumper bar and, therefore, the deformation of the plastic zone of the longitudinal member occurs only after the shock absorber preceding it has been fully pushed in by an impact. Naturally, a bumper arrangement that combines deformable elements with a hydraulic shock absorber is much more expensive and complicated than an arrangement of deformable elements along.

SUMMARY OF THE INVENTION

The present invention is directed to providing a simple and inexpensive bumper system for vehicles, which will allow for the control of the amount of deformation that will occur during the impact. This purpose is achieved in accordance with the present invention by locating at least two oppositely directed stepped-shaped boxes between the longitudinal members and the bumper bar of the vehicle.

In an illustrative embodiment of the invention each pertinent longitudinal structural member has two oppositely arranged stepped-shaped boxes attached to its end. The outermost box with respect to the vehicle body is connected to a tube that is in turn connected to a bumper bar. As a rule, the stepped boxes will have their largest cross-sections facing each other, i.e. a larger cross-section than the other regions of the longitudinal member. However, it is also possible to provide the smallest cross-section of the boxes at their point of contact so that the largest cross-sectional dimensions exist at either end of the deformable zone.

The stepped boxes need not have any particular design and they can be formed to provide the desired control over their deformation. This is true in part because the oppositely oriented arrangement of the boxes allows the dimensions at their point of contact to be the same. Also, the stepped boxes will generally be made of material of different strengths and will have various wall thicknesses so that the boxes will deform one after the other as the impact force increases.

BRIEF DESCRIPTION OF THE DRAWING

The foregoing and other features of the present invention will be more readily apparent from the following detailed description and the drawing of a longitudinal section of a bumper arrangement in accordance with the present invention.

DESCRIPTION OF AN EXEMPLARY EMBODIMENT

In the drawing a bumper bar 1 is shown bolted onto a tube 2 that bears against a longitudinal structural member 3 of the vehicle. Behind a front wall 4 of the vehicle are two oppositely directed stepped-shaped boxes, 6 and 7. These stepped boxes create a deformable zone for a longitudinal member generally designated by 5.

Boxes 6 and 7 each have four stepped regions and they are arranged with opposite orientations so that they become narrower as the distance from their plane of contact 8 increases. Since both boxes are identical there is a savings in cost over previously known designs. Also, there is no problem in assuring that their dimensions match for connection together at the plane of contact 8. The shape of the boxes has an additional advantage in that only the ends of the boxes that contact the rigid zones of the longitudinal member, i.e. the narrowest cross-section, need have any particular size. The other dimensions of the stepped boxes can be independently designed in order to control the progress of energy dissipation during an impact. Besides the independance of design with respect to the dimensions of the boxes, the materials from which the boxes are made can be freely chosen. In particular, the boxes may be made from materials having different strengths and different wall thicknesses in order to control the deformation of the boxes.

During a collision, the impact forces first compress the tube 2 attached to the bumper bar 1. Then, if box 6 is made of weaker material or with thinner walls than box 7, it will deform next. Finally, after box 6 has collapsed, box 7 will begin to deform. Thus, longitudinal member 5 has a deformable zone whose resistance to an impact increases as the passenger compartment is approached by a colliding body.

The arrangement of the two stepped boxes, whose areas of largest cross-section face each other, offers the additional advantage that even in the event of an oblique impact, the deformation of the boxes and the resulting energy dissipation is assured, and no buckling out of the longitudinal member will occur.

While the invention has been particularly shown and described with reference to a preferred embodiment thereof, it will be understood by those skilled in the art that various changes in form and details may be made therein without departing from the spirit and scope of the invention.

We claim:

1. A bumper arrangement for a vehicle, specifically an automobile, equipped with longitudinal structural members that are zonally deformable and a bumper bar connected to the longitudinal members, characterized in that the deformable zones of the longitudinal members each comprise at least two separate oppositely directed stepped-shaped boxes which are joined together, said two stepped-shaped boxes being of different strengths and having their largest cross-sections joined to each other, the stepped-shaped box closest to the vehicle being the strongest of the two stepped-shaped boxes.

2. A bumper arrangement as claimed in claim 1, wherein the stepped boxes of a deformable zone are made of different materials having different strengths.

3. A bumper arrangement as claimed in claim 1, wherein the stepped boxes of a deformable zone have different wall thicknesses.

4. A bumper arrangement as claimed in claim 3, wherein the stepped boxes of a deformable zone are made of different materials having different strengths.

5. A bumper arrangement as claimed in claim 1, further including a tube for attaching the deformable zone of the longitudinal member to the bumper bar.

* * * * *